US008638293B2

(12) United States Patent
Li et al.

(10) Patent No.: US 8,638,293 B2
(45) Date of Patent: Jan. 28, 2014

(54) METHOD AND APPARATUS FOR RESPONDING OPERATIONS

(75) Inventors: Anqi Li, Shenzhen (CN); Min Ren, Shenzhen (CN)

(73) Assignee: Tencent Technology (Shenzhen) Company Limited, Shenzhen, Guangdong (CN)

( * ) Notice: Subject to any disclaimer, the term of this patent is extended or adjusted under 35 U.S.C. 154(b) by 0 days.

(21) Appl. No.: 13/602,847

(22) Filed: Sep. 4, 2012

(65) Prior Publication Data
US 2013/0027309 A1    Jan. 31, 2013

Related U.S. Application Data (63) Continuation of application No. PCT/CN2011/070992, filed on Feb. 15, 2011.

(30) Foreign Application Priority Data

Apr. 30, 2010    (CN) .......................... 2010 1 0163216

(51) Int. Cl.
*G06F 3/01* (2006.01)
(52) U.S. Cl.
USPC ............................ 345/156; 345/341; 345/173
(58) Field of Classification Search
USPC ........................................................ 345/156
See application file for complete search history.

(56) References Cited

U.S. PATENT DOCUMENTS

| 5,726,687 A * | 3/1998 | Belfiore et al. ............... 715/785 |
| 2009/0187842 A1 | 7/2009 | Collins et al. |
| 2010/0149115 A1 * | 6/2010 | Park et al. ..................... 345/173 |

FOREIGN PATENT DOCUMENTS

| CN | 1624631 A | 6/2005 |
| CN | 1945513 A | 4/2007 |
| CN | 101424997 A | 5/2009 |
| WO | 2009142871 A2 | 11/2009 |

OTHER PUBLICATIONS

International Search Report for International Patent Application No. PCT/CN2011/070992, dated May 19, 2011, and English translation thereof.

* cited by examiner

*Primary Examiner* — Sumati Lefkowitz
*Assistant Examiner* — Jose Soto Lopez (57) ABSTRACT

A method for responding operations includes: intercepting a press-down event of a pointer equipment to obtain press-down position and time of the pointer equipment; intercepting a moving event of the pointer equipment to obtain a current position where the pointer equipment moves and time when the pointer equipment moves to the current position; calculating to obtain residence time, movement speed and movement direction of the pointer equipment according to the press-down position and time as well as the current position where the pointer equipment moves and the time when the pointer equipment moves to the current position; judging whether the current gesture is a dragging gesture or a scrolling gesture according to the residence time, movement speed and movement direction, executing a dragging operation if the current gesture is the dragging gesture, and executing a scrolling operation if the current gesture is the scrolling gesture.

16 Claims, 3 Drawing Sheets

METHOD AND APPARATUS FOR RESPONDING OPERATIONS

CROSS-REFERENCE TO RELATED APPLICATIONS

This application is a continuation of International Application No. PCT/CN2011/070992, filed on Feb. 15, 2011. This application claims the benefit and priority of Chinese Patent Application No. 201010163216.1, filed Apr. 30, 2012. The entire disclosures of each of the above applications are incorporated herein by reference.

FIELD

The present disclosure relates to computer technology, and more particularly to a method and apparatus for responding operations.

BACKGROUND

This section provides background information related to the present disclosure which is not necessarily prior art.

With the development of technology, touch devices having touch screen interfaces, such as iPhone and so on, have been increasingly popular. The greatest feature of the touch devices is that touch operations can be achieved, and the common touch operations include: clicking, scrolling, and dragging and so on. The current touch devices can support users' scrolling operation and dragging operation, respectively. For example, one user can perform scrolling operation to look up contacts after the user opens the address book, or the user can drag function icons in the main interface to change display positions and so on.

The existing touch devices generally have the following problems: when the scrolling operation is supported, the dragging operation cannot be supported; when the dragging operation is supported, the scrolling operation cannot be supported, i.e., the dragging operation and the scrolling operation cannot be supported simultaneously, resulting in poor user experience.

With the increasing demand of users, scenarios which need to simultaneously support both of the dragging operation and the scrolling operation occur more and more. For example, when the currently widely used instant messaging (IM) software is installed in the touch device, users are not merely content to look up contacts in the contact list through scrolling operation, and also want to open a chat dialog box through dragging operation. Thus, how to suppor both dragging and scrolling operations is a feature of increasing demand.

SUMMARY

This section provides a general summary of the disclosure, and is not a comprehensive disclosure of its full scope or all of its features.

In order to solve the problem that the existing technology cannot simultaneously support both of dragging operation and scrolling operation, one embodiment provides a method and apparatus for responding operations. The technical solution is as follows:

A method for responding operations, the method includes:
intercepting a press-down event of a pointer equipment to obtain a press-down position and time of the pointer equipment;
intercepting a moving event of the pointer equipment to obtain a current position where the pointer equipment moves and a time when the pointer equipment moves to the current position;
calculating to obtain residence time, movement speed and movement direction of the pointer equipment according to the press-down position and time as well as the current position where the pointer equipment moves and the time when the pointer equipment moves to the current position; and
judging whether the current gesture is dragging gesture or scrolling gesture according to the residence time, the movement speed and the movement direction, executing dragging operation if the current gesture is dragging gesture, and executing scrolling operation if the current gesture is scrolling gesture.

The calculating to obtain residence time and movement speed of the pointer equipment according to the press-down position and time as well as the current position where the pointer equipment moves and the time when the pointer equipment moves to the current position comprises:
calculating a difference between the time when the pointer equipment moves to the current position and the press-down time, to obtain the residence time of the pointer equipment; and
calculating to obtain the movement speed of the pointer equipment according to a difference between the current position where the pointer equipment moves and the press-down position.

The calculating to obtain movement direction of the pointer equipment according to the press-down position and time as well as the current position where the pointer equipment moves and the time when the pointer equipment moves to the current position comprises:
calculating to obtain the movement direction of the pointer equipment according to following formulas:

$$A = \begin{cases} \arctan[(Y2-Y1)/(X2-X1)], & X1 \neq X2 \\ 90°, & Y2 > Y1, X1 = X2 \\ -90°, & Y2 < Y1, X1 = X2; \end{cases}$$

where X1 and Y1 are a horizontal ordinate and a vertical ordinate of the press-down position, respectively, X2 and Y2 are a horizontal ordinate and a vertical ordinate of the current position where the pointer equipment moves, respectively, and A is the movement direction of the pointer equipment which is represented with an angle.

The judging whether the current gesture is dragging gesture or scrolling gesture according to the residence time, the movement speed and the movement direction comprises:
calculating a probability of dragging gesture and a probability of scrolling gesture, respectively, according to the residence time, the movement speed and the movement direction;
comparing the probability of dragging gesture and the probability of scrolling gesture with a preset threshold value;
if the probability of dragging gesture is higher than the threshold value, and the threshold value is higher than the probability of scrolling gesture, then judging that the current gesture is dragging gesture; and
if the probability of scrolling gesture is higher than the threshold value, and the threshold value is higher than the probability of dragging gesture, then judging that the current gesture is scrolling gesture.

The calculating a probability of dragging gesture and a probability of scrolling gesture, respectively, according to the residence time, the movement speed and the movement direction comprises:

comparing the residence time with a preset time threshold value, to obtain a time probability of dragging gesture and a time probability of scrolling gesture;

comparing the movement speed with a preset speed threshold value, to obtain a speed probability of dragging gesture and a speed probability of scrolling gesture;

comparing the movement direction with a preset angle threshold value, to obtain a direction probability of dragging gesture and a direction probability of scrolling gesture;

calculating a weighted average of the time probability, speed probability and direction probability of dragging gesture according to preset time weight, speed weight and direction weight, to obtain probability of dragging gesture; and calculating a weighted average of the time probability, speed probability and direction probability of scrolling gesture according to the time weight, speed weight and direction weight, to obtain probability of scrolling gesture.

The pointer equipment is a mouse, finger or touch pen.

An apparatus for responding operations, the apparatus comprises:

an obtaining module, configured to intercept a press-down event of a pointer equipment to obtain press-down position and time of the pointer equipment, and intercept a moving event of the pointer equipment to obtain a current position where the pointer equipment moves and time when the pointer equipment moves to the current position;

a calculating module, configured to calculate to obtain residence time, movement speed and movement direction of the pointer equipment according to the press-down position and time as well as the current position where the pointer equipment moves and the time when the pointer equipment moves to the current position obtained by the obtaining module; and a processing module, configured to judge whether the current gesture is dragging gesture or scrolling gesture according to the residence time, movement speed and movement direction obtained by calculation of the calculating module, execute dragging operation if the current gesture is dragging gesture, and execute scrolling operation if the current gesture is scrolling gesture.

The calculating module comprises:

a time calculating unit, configured to calculate a difference between the time when the pointer equipment moves to the current position and the press-down time, to obtain a residence time of the pointer equipment; and a speed calculating unit, configured to calculate to obtain movement speed of the pointer equipment according to a difference between the current position where the pointer equipment moves and the press-down position.

The calculating module comprises:

a direction calculating unit, configured to calculate to obtain movement direction of the pointer equipment according to following formulas:

$$A = \begin{cases} \arctan[(Y2-Y1)/(X2-X1)], & X1 \neq X2 \\ 90°, & Y2 > Y1, X1 = X2 \\ -90°, & Y2 < Y1, X1 = X2; \end{cases}$$

where X1 and Y1 are a horizontal ordinate and a vertical ordinate of the press-down position, respectively, X2 and Y2 are a horizontal ordinate and a vertical ordinate of the current position where the pointer equipment moves, respectively, and A is the movement direction of the pointer equipment which is represented with an angle.

The processing module includes:

a probability calculating unit, configured to calculate a probability of dragging gesture and a probability of scrolling gesture, respectively, according to the residence time, the movement speed and the movement direction; and a judging unit, configured to compare the probability of dragging gesture and the probability of scrolling gesture which are obtained through calculation of the probability calculating unit with a preset threshold value; if the probability of dragging gesture is higher than the threshold value, and the threshold value is higher than the probability of scrolling gesture, then judge that the current gesture is dragging gesture; if the probability of scrolling gesture is higher than the threshold value, and the threshold value is higher than the probability of dragging gesture, then judge that the current gesture is scrolling gesture.

The probability calculating unit comprises:

a first calculating subunit, configured to compare the residence time with a preset time threshold value, to obtain a time probability of dragging gesture and a time probability of scrolling gesture; compare the movement speed with a preset speed threshold value, to obtain a speed probability of dragging gesture and a speed probability of scrolling gesture; compare the movement direction with a preset angle threshold value, to obtain a direction probability of dragging gesture and a direction probability of scrolling gesture; and a second calculating subunit, configured to calculate a weighted average of the time probability, speed probability and direction probability of dragging gesture according to preset time weight, speed weight and direction weight, to obtain the probability of dragging gesture; calculate a weighted average of the time probability, speed probability and direction probability of scrolling gesture according to the time weight, speed weight and direction weight, to obtain probability of scrolling gesture.

The pointer equipment is a mouse, finger or touch pen.

The technical solution provided in one embodiment of the present identifies whether the current gesture is a dragging gesture or a scrolling gesture through calculating the residence time, the movement speed and the movement direction of the pointer equipment, and executes corresponding operations, realizes supporting for both of dragging operation and scrolling operation, and greatly improve user experiences.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

DETAILED DESCRIPTION

To make the objectives, technical solution and advantages of the present disclosure more clear, example embodiments will now be described more fully with reference to the accompanying drawings.

Reference throughout this specification to "one embodiment," "an embodiment," "specific embodiment," or the like in the singular or plural means that one or more particular features, structures, or characteristics described in connection with an embodiment is included in at least one embodiment of the present disclosure. Thus, the appearances of the phrases "in one embodiment" or "in an embodiment," "in a specific embodiment," or the like in the singular or plural in various places throughout this specification are not necessarily all referring to the same embodiment. Furthermore, the particular features, structures, or characteristics may be combined in any suitable manner in one or more embodiments.

Figure 1:
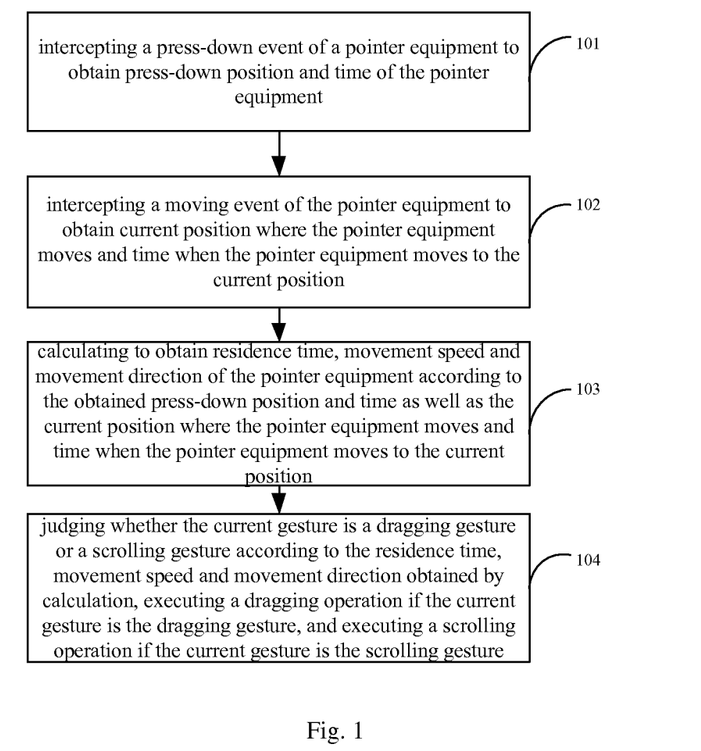
FIG. 1 is a flow chart of a method for responding operations provided in various embodiments.

Referring to FIG. 1, one various embodiment provides a method for responding operations, which includes:

At 101: intercepting a press-down event of a pointer equipment to obtain press-down position and time of the pointer equipment.

At 102: intercepting a moving event of the pointer equipment to obtain current position where the pointer equipment moves and time when the pointer equipment moves to the current position.

At 103: calculating to obtain residence time, movement speed and movement direction of the pointer equipment according to the obtained press-down position and time as well as the current position where the pointer equipment moves and the time when the pointer equipment moves to the current position.

At 104: judging whether the current gesture is a dragging gesture or a scrolling gesture according to the residence time, movement speed and movement direction obtained by calculation, executing a dragging operation if the current gesture is the dragging gesture, and executing a scrolling operation if the current gesture is the scrolling gesture.

The pointer equipment in an embodiment is an input equipment, through which press-down, lift up and moving events can be produced in graphical user interface (GUI) to trigger an apparatus where the GUI locates to execute corresponding operations. The apparatus where the GUI locates can be a touch device or computer and so on, the touch device referring to a device having touch screen, including but not limited to mobile telephone and Personal Digital Assistant (PDA) having a touch screen etc. The computer includes but is not limited to desktop computer, notebook computer etc., the embodiment does not specifically limit it here.

In an embodiment, the pointer equipment includes but is not limited to a mouse, finger or touch pen etc. When the pointer equipment is a mouse, the above method can be applied in a scene in which a user uses the mouse to operate in the interface of a terminal screen. When the pointer equipment is a finger or touch pen, the above method can be applied in a scene in which a user uses the finger or touch pen to execute touch operation in the interface of the touch device. In either scene, embodiments all execute identifying and responding specifically for the two kinds of operations: dragging and scrolling.

The residence time of the pointer equipment refers to a stay time when the pointer equipment moves in the interface. This time can be calculated through a difference between the time when the pointer equipment moves to the current position and the press-down time of the pointer equipment. The movement speed of the pointer equipment refers to a speed at which the pointer equipment moves in the interface. This speed can be calculated through a difference between the current position where the pointer equipment moves and the press-down position of the pointer equipment. The movement direction of the pointer equipment refers to a direction, along which the pointer equipment moves in the interface and which can be represented with an angle between a straight line formed by connecting the current position where the pointer equipment moves with the press-down position of the pointer equipment and the horizontal coordinate axis, the angle can be calculated through the press-down position and time of the pointer equipment as well as the current position where the pointer equipment moves and the time when the pointer equipment moves to the current position. For example, the horizontal direction is regarded as an abscissa axis, and the vertical direction is regarded as a vertical axis, when a user touches a touch screen of a mobile phone with a finger, a position where the finger presses is regarded as an origin. If the finger moves upward along the vertical direction, the abscissa is unchanged, a distance between the current position where the finger moves and the origin is a difference of vertical coordinates of the two points, and the result is a positive number, thus, an angle which represents the movement direction of the finger is 90 degrees. If the finger moves downward along the vertical direction, the abscissa is unchanged, a distance between the current position where the finger moves and the origin is a difference of vertical coordinates of the two points, and the result is a negative number, thus, an angle which represents the movement direction of the finger is −90 degrees, and so on.

The above method provided in an embodiment identifies whether the current gesture is a dragging gesture or a scrolling gesture through calculating the residence time, the movement speed and the movement direction of the pointer equipment, and executes corresponding operation, realizes supporting for both of dragging operation and scrolling operation and overcomes the defects of the existing technology and greatly improve user experiences. The above method supports not only mouse operation, but also supports finger operation or touch operation, has a wide range of application and a strong compatibility.

Figure 2:
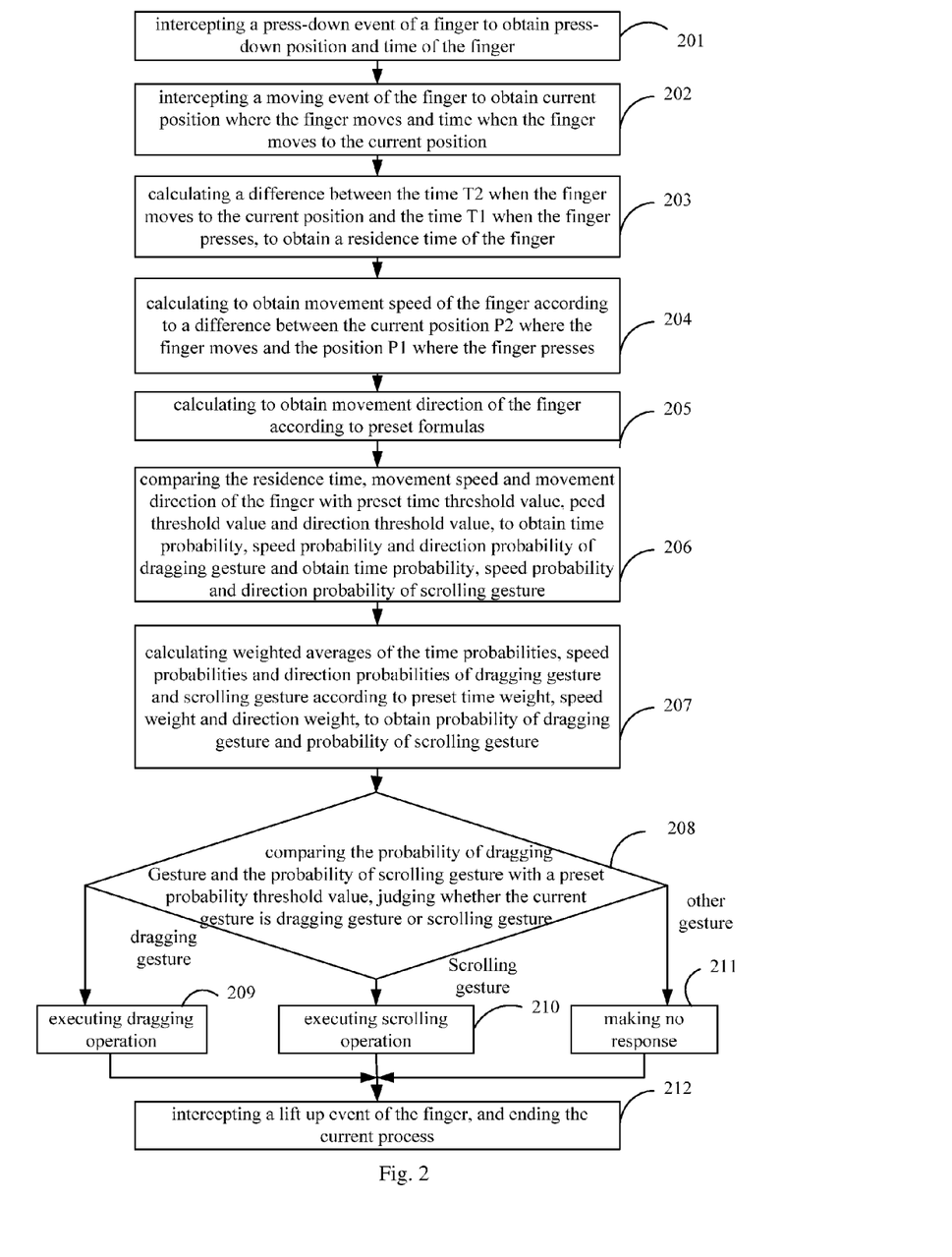
FIG. 2 is a flow chart of a method for responding operations provided in various embodiments.

Referring to FIG. 2, one various embodiment provides a method of responding operation, which is illustrated by taking the finger as an example of the pointer equipment and specifically includes:

At 201: intercepting a press-down event of a finger to obtain press-down position and time of the finger.

Specifically, the press-down event of the finger can be mapped into a press-down event of a mouse, i.e., MouseButtonDown event, when a user presses a finger on a touch screen, a MouseButtonDown event can be intercepted.

In the handling function of the MouseButtonDown event, a position P1 where the finger presses and time T1 when the finger presses can be obtained, the position P1 can be represented with two values: a horizontal ordinate X1 and a vertical ordinate Y1, i.e., (X1, Y1).

At 202: intercepting a moving event of the finger to obtain current position where the finger moves and time when the finger moves to the current position.

Specifically, the moving event of the finger can be mapped into a moving event of a mouse, i.e., MouseMove event, when the user moves the finger on the touch screen, a MouseMove event can be intercepted.

In the handling function of the MouseMove event, a current position P2 where the finger moves and time T2 when the finger moves to the current position P2 can be obtained, the position P2 can be represented as (X2, Y2), where X2 is a horizontal ordinate, and Y2 is a vertical ordinate.

At 203: calculating a difference between the time T2 when the finger moves to the current position P2 and the time T1 when the finger presses, to obtain a residence time of the finger.

The residence time of the finger is represented with T, and the specific formula is as follows:

$$T=T2-T1;$$

For example, a time when the finger presses is 20 milliseconds after 9 o'clock, a time when the finger moves to the current position is 120 milliseconds after 9 o'clock, then, the residence time of the finger is 100 ms.

At 204: calculating to obtain a movement speed of the finger according to a difference between the current position P2 where the finger moves and the position P1 where the finger presses.

The movement speed of the finger is represented with V, and the specific formula is as follows:

$$V=(P2-P1)/t;$$

where t is a refresh time of position movement of the mouse, is a fixed value of the system and is a known constant, thus, this formula can also be simplified represented as:

$$V=P2-P1;$$

In an embodiment, P2−P1 is vector operation and represents a distance between the two points: the positions P1 and P2.

At 205: calculating to obtain movement direction of the finger according to the following formulas:

$$A = \begin{cases} \arctan[(Y2-Y1)/(X2-X1)], & X1 \neq X2 \\ 90°, & Y2 > Y1, X1 = X2 \\ -90°, & Y2 < Y1, X1 = X2; \end{cases}$$

where X1 and Y1 are the horizontal ordinate and the vertical ordinate of the position P1 where the finger presses, respectively, X2 and Y2 are the horizontal ordinate and the vertical ordinate of the current position P2 where the finger moves, respectively, and A is the movement direction of the finger which is represented with an angle.

In various embodiments, there is no fixed sequence among 203, 204 and 205, and the above sequence is only one of the implementations. They can be performed in any other sequence, or they can be performed simultaneously. The various embodiments do not specifically limit this.

At 206: comparing the residence time T of the finger with a preset time threshold value, to obtain a time probability Drag1 of dragging gesture and a time probability Scroll1 of scrolling gesture; comparing the movement speed V of the finger with a preset speed threshold value, to obtain a speed probability Drag2 of dragging gesture and a speed probability Scroll2 of scrolling gesture; comparing the movement direction A of the finger with a preset angle threshold value, to obtain a direction probability Drag3 of dragging gesture and a direction probability Scroll3 of scrolling gesture.

The time threshold value, the speed threshold value and the direction threshold value can be set according to experiences, and any one type of the above set threshold values can also be adjusted at any moment according to needs. An embodiment not specifically limit the size and number of threshold value of any type. For any type, one or multiple threshold values can be set, regardless of whether one or multiple threshold values, the value is not limited. For example, one time threshold value can be set and its value can be 200 ms; two speed threshold values can be set and their values can be 20 and 90, respectively; and two direction threshold values can be set, and their values can be 30° and 60°, respectively, and so on.

In an embodiment, the above various probabilities meet the following relations:

$$\text{Drag1}+\text{Scroll1}\leq 1;$$

$$\text{Drag2}+\text{Scroll2}\leq 1;$$

$$\text{Drag3}+\text{Scroll3}\leq 1.$$

Obtaining probabilities of dragging gesture and scrolling gesture by comparing with the threshold values can be performed according to a preset rule, and the preset rule can be set according to experiences and is specifically as follows:

1) when a stay time is longer after a finger presses down, the probability that the current gesture is a dragging gesture is higher. When a stay time is shorter after a finger presses down, the probability that the current gesture is a scrolling gesture is higher;

2) when a movement speed of a finger is slower, the probability that the current gesture is a dragging gesture is higher. When a movement speed of a finger is faster, the probability that the current gesture is a scrolling gesture is higher;

3) when a movement direction of a finger is perpendicular to a list arrangement direction, the probability that the current gesture is a dragging gesture is higher. When a movement direction of a finger is parallel to a list arrangement direction, the probability that the current gesture is a scrolling gesture is higher.

The probabilities of dragging gesture and scrolling gesture can be determined according to the above rule, since the above rule only defines tendency of the two probabilities, i.e., representing that the probability of which gesture is higher. Thus, an embodiment does not specifically limit specific values of the probability of dragging gesture and specific values of the probability of scrolling gesture, so long as the tendency of the current gesture can be distinguished according to values of the two. If it is determined the time probability Drag1 of dragging gesture is higher and the time probability Scroll1 of scrolling gesture is smaller, then values of the two can be set to be as: Drag1=1, Scroll1=0, or can be set to be as Drag1=0.8, Scroll1=0.1, and so on.

Specifically, determining the probability of dragging gesture and the probability of scrolling gesture according to the above rule can be specifically as:

1) setting a time threshold value Ta, and comparing the residence time T of the finger with the time threshold value Ta:

if T≤Ta, then Drag1=M1, Scroll1=M2, where M1<M2;
if T>Ta, then Drag1=N1, Scroll1=N2, where N1>N2;
Further, M2 and N1 can be the same or different, and M1 and N2 can be the same or different. In addition, the above two scenes can also set T<Ta and T≥Ta, and corresponding probability values are not changed, and the embodiment does not specifically limit this.

For example, a time threshold value is 200 ms, if T<200 ms, then setting Drag1=0, Scroll1=0.9; if T>200 ms, then setting Drag1=0.9, Scroll1=0.

2) setting two speed threshold values V1 and V2, V1<V2, comparing the movement speed V of the finger with the two speed threshold values:
if V>V2, then Drag2=I1, Scroll2=I2, where I1<I2;
if V<V1, then Drag2=J1, Scroll2=J2, where J1>J2;
if V1≤V≤V2, then Drag2=0, Scroll2=0;
Further, I2 and J1 can be the same or different, and I1 and J2 can be the same or different. In addition, the above three scenes can also set V≥V2, V≤V1, V1<V<V2, or V>V2, V≤V1, V1<V≤V2, and so on, and corresponding probability values are not changed, V=V1 and V=V2 can be in any one of the above three scenes, and the embodiment does not specifically limit this.

For example, setting the two speeds as 10 and 100, respectively, if V>100, then setting Drag2=0 and Scroll2=1; if V<10, then setting Drag2=0.7, Scroll2=0.3, if 10<V<100, then setting Drag2=Scroll2=0.

3) setting two direction threshold values A1 and A2, A1<A2, comparing the movement direction A of the finger with the two direction threshold values:
if |A|≥A2, then Drag3=K1, Scroll3=K2, where K1<K2;
if |A|>A1, then Drag3=L1, Scroll3=L2, where L1>L2;
if A1<|A|<A2, then Drag3=0, Scroll3=0;
Further, K2 and L1 can be the same or different, and K1 and L2 can be the same or different. In addition, similarly with the speed scene, |A|=A1 and |A|=A2 can be in any one of the above three scenes, and the embodiment does not specifically limit this.

For example, setting the two direction threshold values as 30° and 60°, respectively, if |A|≥60°, then setting Drag3=0, Scroll3=1; if |A|≤30°, then setting Drag3=1, Scroll=0, if 30°<|A|<60°, then setting Drag3=Scroll3=0.

In this step, there is no fixed sequence to determine time probability, speed probability and direction probability, and the above sequence is only one of the implementations. They can be performed in any other sequence, or they can be performed simultaneously, as the embodiment does not specifically limit this.

At 207: calculating a weighted average of the time probability, speed probability and direction probability of dragging gesture according to preset time weight, speed weight and direction weight, to obtain probability Drag of dragging gesture; calculating a weighted average of the time probability, speed probability and direction probability of scrolling gesture according to the above time weight, speed weight and direction weight, to obtain probability Scroll of scrolling gesture.

R1, R2 and R3 are used to represent time weight, speed weight and direction weight, respectively, then R1, R2 and R3 meet the following relations:

$R1≥0, R2≥0, R3≥0,$ and $R1+R2+R3=1.$

Specifically, the calculation formulas of the probability Drag of dragging gesture and the probability Scroll of scrolling gesture are as follows:

Drag=$R1$×Drag1+$R2$×Drag2+$R3$×Drag3;

Scroll=$R1$×Scroll1+$R2$×Scroll2+$R3$×Scroll3;

In an embodiment, values of the above three weights R1, R2 and R3 can be set according to experiences, and in actual applications, the values of R1, R2 and R3 can also be adjusted according to actual situations. An embodiment does not specifically limit this. Setting and adjusting the values of R1, R2 and R3 can be executed with reference to specific application scenes. For example, in an application scene of operating a file list, there are often operations of dragging files, at this time, the residence time and movement speed of the finger are key parameters to consider, thus, values of R1 and R2 can be set larger for this scene, and value of R3 can be set smaller; or, in an application scene of operating a contact list, there are often operations of scrolling the list to check, the movement direction of the finger is key parameter to consider, thus, value of R3 can be set larger for this scene, and values of R1 and R2 can be set smaller. As for which scene the system is currently in can be known through obtaining corresponding scene information, which can be achieved by the existing means, and an embodiment does not give too much description.

At 208: comparing the probability Drag of dragging gesture and the probability Scroll of scrolling gesture which are obtained through calculation with a preset probability threshold value, judging whether the current gesture is dragging gesture or scrolling gesture; if the current gesture is dragging gesture, then performing 209; if the current gesture is scrolling gesture, then performing 210; if the current gesture is neither dragging gesture nor scrolling gesture, then performing 211.

In an embodiment, the preset probability threshold value is represented with H, and the above judging process can be specifically as follows:
if Drag>H>Scroll, then judging that the current gesture is dragging gesture;
if Scroll>H>Drag, then judging that the current gesture is scrolling gesture;
if neither Drag>H>Scroll nor Scroll>H>Drag is met, then judging that the current gesture is unknown gesture.

The probability threshold value H can be set according to experience, for example, it can be set as 0.5 or 0.6 and so on, or it can be set as other values, and can be adjusted according to needs, and an embodiment does not specifically limit it.

At 209: the current gesture being identified as dragging gesture, thus, executing dragging operation; later, performing 21.

At 210: the current gesture being identified as scrolling gesture, thus, executing scrolling operation; later, performing 212.

At 211: the current gesture being identified as unknown gesture, thus, making no response to the current gesture; later, performing 212.

At 212: intercepting a lift up event of the finger, and ending the current process.

Specifically, the lift up event of the finger can be mapped into a lift up event of a mouse, i.e., MouseButtonUp event, when a user lifts up his finger on the touch screen, a MouseButtonUp event can be intercepted, and the current touch operation is ended.

The above method provided in various embodiments identifies whether the current gesture is a dragging gesture or a scrolling gesture through calculating the residence time, the movement speed and the movement direction of the pointer equipment, and executes corresponding operations, realizes supporting for both of dragging operation and scrolling operation and overcomes the defects of the existing technology and greatly improve user experiences.

The responding progress for finger operations described in the above method, when the pointer equipment is a touch pen, the responding progress for the touch pen operations is similar to those of the above method of an embodiment, mapping a press-down event of the touch pen into a press-down event of a mouse, mapping a moving event of the touch pen into a moving event of a mouse and mapping a lift up event of the touch pen into a lift up event of a mouse are the same to those of the above method of an embodiment. The only difference in the whole process is that the initiating operation is a finger or a touch pen, and the rest are the same. Thus, it will not be repeated here. When the pointer equipment is a mouse, the responding progress for mouse operations is similar to those of the above method of this embodiment. However, there are two differences: one is that the initiating operation is a finger or a touch pen, and the other is that mapping is not needed for the mouse, directly intercepting are press-down event of mouse, moving event of mouse and lift up event of mouse, and the rest are the same. Thus, it will not be repeated here. The method provided in an embodiment supports not only mouse operation, but also finger operation or touch operation, has a wide range of application and a strong compatibility.

Figure 3:
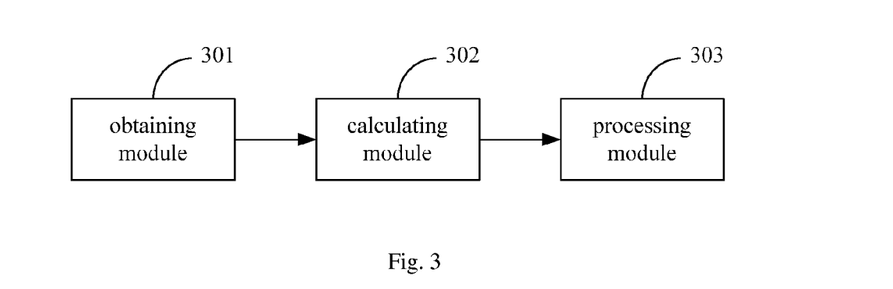
FIG. 3 is a schematic diagram of an apparatus for responding operations provided in various embodiments.

Referring to FIG. 3, various embodiments provide an apparatus for responding operations, which includes:

an obtaining module 301, configured to intercept a press-down event of a pointer equipment to obtain press-down position and time of the pointer equipment, and intercept a moving event of the pointer equipment to obtain current position where the pointer equipment moves and time when the pointer equipment moves to the current position;

a calculating module 302, configured to calculate to obtain residence time, movement speed and movement direction of the pointer equipment according to the press-down position and time as well as the current position where the pointer equipment moves and time when the pointer equipment moves to the current position obtained by the obtaining module 301;

a processing module 303, configured to judge whether the current gesture is dragging gesture or scrolling gesture according to the residence time, movement speed and movement direction obtained by calculation of the calculating module 302, execute a dragging operation if the current gesture is dragging gesture, and execute a scrolling operation if the current gesture is scrolling gesture.

Figure 4:
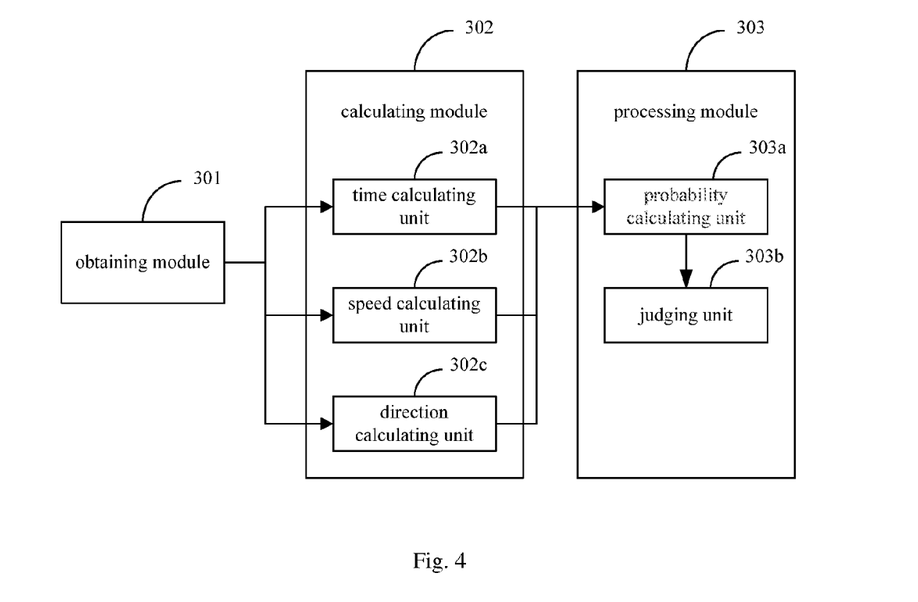
FIG. 4 is another schematic diagram of an apparatus for responding operations provided in various embodiments.

Referring to FIG. 4, the calculating module 302 can further include:

a time calculating unit 302a, configured to calculate a difference between the time when the pointer equipment moves to the current position and the time when the pointer equipment presses, to obtain a residence time of the pointer equipment;

a speed calculating unit 302b, configured to calculate to obtain movement speed of the pointer equipment according to a difference between the current position where the pointer equipment moves and the position where the pointer equipment presses.

Further, the calculating module 302 can further include:

a direction calculating unit 302c, configured to calculate to obtain movement direction of the pointer equipment according to the following formulas:

$$A = \begin{cases} \arctan[(Y2-Y1)/(X2-X1)], & X1 \neq X2 \\ 90°, & Y2 > Y1, X1 = X2 \\ -90°, & Y2 < Y1, X1 = X2; \end{cases}$$

where X1 and Y1 are the horizontal ordinate and the vertical ordinate of the position where the pointer equipment presses, respectively, X2 and Y2 are the horizontal ordinate and the vertical ordinate of the current position where the finger moves, respectively, and A is the movement direction of the pointer equipment which is represented with an angle.

In an embodiment, the processing module 303 includes:

a probability calculating unit 303a, configured to calculate a probability of dragging gesture and a probability of scrolling gesture, respectively, according to the residence time, the movement speed and the movement direction of the pointer equipment;

a judging unit 303b, configured to compare the probability of dragging gesture and the probability of scrolling gesture which are obtained through calculation of the probability calculating unit 303a with a preset threshold value; if the probability of dragging gesture is higher than the threshold value, and the threshold value is higher than the probability of scrolling gesture, then judge that the current gesture is dragging gesture; if the probability of scrolling gesture is higher than the threshold value, and the threshold value is higher than the probability of dragging gesture, then judge that the current gesture is scrolling gesture.

The probability calculating unit 303a can include (not shown in the figure to simplify drawings):

a first calculating subunit, configured to compare the residence time of the pointer equipment with a preset time threshold value, to obtain a time probability of dragging gesture and a time probability of scrolling gesture; compare the movement speed of the pointer equipment with a preset speed threshold value, to obtain a speed probability of dragging gesture and a speed probability of scrolling gesture; compare the movement direction of the pointer equipment with a preset angle threshold value, to obtain a direction probability of dragging gesture and a direction probability of scrolling gesture;

a second calculating subunit, configured to calculate a weighted average of the time probability, speed probability and direction probability of dragging gesture according to preset time weight, speed weight and direction weight, to obtain the probability of dragging gesture; calculate a weighted average of the time probability, speed probability and direction probability of scrolling gesture according to the time weight, speed weight and direction weight, to obtain probability of scrolling gesture.

The above apparatus provided in an embodiment, specifically can be terminal, touch device, and so on, such as computer, notebook computer, mobile telephone having touch function, and so on. The device and the method of the above embodiments belong to the same concept, and any method provided in the above method embodiments can be run in the apparatus, and the specific realization process refers to the method embodiment, and will not be repeated here.

The above apparatus provided in an embodiment identifies whether the current gesture is dragging gesture or scrolling gesture through calculating the residence time, the movement speed and the movement direction of the pointer equipment, and executes corresponding operations, realizes supporting for both of dragging operation and scrolling operation and overcomes the defects of the existing technology and greatly improve user experiences. The above apparatus supports not only mouse operation, but also supports finger operation or touch operation, has a wide range of application and a strong compatibility.

Finally, it should be noted that one skilled in the art would recognize that the whole or parts of the process of the method in the above embodiment can be realized by computer program instructing related hardware, the computer program is stored in a computer readable storage medium, when the program is executed, it can include a process of the embodiment of the above each method. The storage medium can be diskette, compact disc, Read-Only Memory (ROM) or Random Access Memory (RAM), and so on.

The various function units of an embodiment can be integrated in a processing module, and each unit can also be a separate physical presence, and two or more units can also be integrated in a module. The above integrated module can be achieved in the form of hardware, and can also be achieved in the form of software function modules. If the integrated module is achieved in the form of software function modules and is sold or used as a separate product, the integrated module can also be stored in a computer readable storage medium. The above mentioned storage medium can be ROM, Disk or CD-ROM and so on. The above each apparatus or system can perform the method of corresponding method embodiment.

The foregoing are only preferred embodiments provided for purposes of illustration and description, and is not intended to be exhaustive or to limit the disclosure. Individual elements or features of a particular embodiment are generally not limited to that particular embodiment, but, where applicable, are interchangeable and can be used in a selected embodiment, even if not specifically shown or described. The Same may also be varied in many ways. Such variations are not to be regarded as departure from the disclosure, and any variation, modification, equivalent replacement, or improvement made are intended to be included within the scope of the disclosure.

What is claimed is:

1. A method for responding operations, the method comprising:
   intercepting a press-down event of a pointer equipment to obtain a press-down position and time of the pointer equipment;
   intercepting a moving event of the pointer equipment to obtain a current position where the pointer equipment moves and a time when the pointer equipment moves to the current position;
   calculating to obtain residence time, movement speed and movement direction of the pointer equipment according to the press-down position and time as well as the current position where the pointer equipment moves and the time when the pointer equipment moves to the current position;
   judging whether current gesture is dragging gesture or scrolling gesture according to the residence time, the movement speed and the movement direction, executing dragging operation if the current gesture is dragging gesture, and executing scrolling operation if the current gesture is scrolling gesture;
   wherein the judging whether the current gesture is dragging gesture or scrolling gesture according to the residence time, the movement speed and the movement direction comprises:
   calculating a probability of dragging gesture and a probability of scrolling gesture, respectively, according to the residence time, the movement speed and the movement direction;
   comparing the probability of dragging gesture and the probability of scrolling gesture with a preset threshold value;
   if the probability of dragging gesture is higher than the threshold value, and the threshold value is higher than the probability of scrolling gesture, then judging that the current gesture is dragging gesture;
   if the probability of scrolling gesture is higher than the threshold value, and the threshold value is higher than the probability of dragging gesture, then judging that the current gesture is scrolling gesture.

2. The method according to claim 1, wherein the calculating to obtain residence time and movement speed of the pointer equipment according to the press-down position and time as well as the current position where the pointer equipment moves and the time when the pointer equipment moves to the current position comprises:
   calculating a difference between the time when the pointer equipment moves to the current position and the press-down time, to obtain the residence time of the pointer equipment;
   calculating to obtain the movement speed of the pointer equipment according to a difference between the current position where the pointer equipment moves and the press-down position.

3. The method according to claim 1, wherein the calculating to obtain movement direction of the pointer equipment according to the press-down position and time as well as the current position where the pointer equipment moves and the time when the pointer equipment moves to the current position comprises:
   calculating to obtain the movement direction of the pointer equipment according to following formulas:

$$A = \begin{cases} \arctan[(Y2-Y1)/(X2-X1)], & X1 \neq X2 \\ 90°, & Y2 > Y1, X1 = X2 \\ -90°, & Y2 < Y1, X1 = X2; \end{cases}$$

where X1 and Y1 are a horizontal ordinate and a vertical ordinate of the press-down position, respectively, X2 and Y2 are a horizontal ordinate and a vertical ordinate of the current position where the pointer equipment moves, respectively, and A is the movement direction of the pointer equipment which is represented with an angle.

4. The method according to claim 1, wherein the calculating a probability of dragging gesture and a probability of scrolling gesture, respectively, according to the residence time, the movement speed and the movement direction comprises:
   comparing the residence time with a preset time threshold value, to obtain a time probability of dragging gesture and a time probability of scrolling gesture;
   comparing the movement speed with a preset speed threshold value, to obtain a speed probability of dragging gesture and a speed probability of scrolling gesture;
   comparing the movement direction with a preset angle threshold value, to obtain a direction probability of dragging gesture and a direction probability of scrolling gesture;

calculating a weighted average of the time probability, speed probability and direction probability of dragging gesture according to preset time weight, speed weight and direction weight, to obtain probability of dragging gesture;

calculating a weighted average of the time probability, speed probability and direction probability of scrolling gesture according to the time weight, speed weight and direction weight, to obtain probability of scrolling gesture.

5. The method according to claim 2, wherein the pointer equipment is a mouse, finger or touch pen.

6. The method according to claim 3, wherein the pointer equipment is a mouse, finger or touch pen.

7. The method according to claim 1, wherein the pointer equipment is a mouse, finger or touch pen.

8. The method according to claim 4, wherein the pointer equipment is a mouse, finger or touch pen.

9. An apparatus for responding operations, the apparatus comprising:

an obtaining module, configured to intercept a press-down event of a pointer equipment to obtain press-down position and time of the pointer equipment, and intercept a moving event of the pointer equipment to obtain a current position where the pointer equipment moves and time when the pointer equipment moves to the current position;

a calculating module, configured to calculate to obtain residence time, movement speed and movement direction of the pointer equipment according to the press-down position and time as well as the current position where the pointer equipment moves and the time when the pointer equipment moves to the current position obtained by the obtaining module;

a processing module, configured to judge whether the current gesture is dragging gesture or scrolling gesture according to the residence time, movement speed and movement direction obtained by calculation of the calculating module, execute dragging operation if the current gesture is dragging gesture, and execute scrolling operation if the current gesture is scrolling gesture;

wherein the processing module includes:

a probability calculating unit, configured to calculate a probability of dragging gesture and a probability of scrolling gesture, respectively, according to the residence time, the movement speed and the movement direction;

a judging unit, configured to compare the probability of dragging gesture and the probability of scrolling gesture which are obtained through calculation of the probability calculating unit with a preset threshold value; if the probability of dragging gesture is higher than the threshold value, and the threshold value is higher than the probability of scrolling gesture, then judge that the current gesture is dragging gesture; if the probability of scrolling gesture is higher than the threshold value, and the threshold value is higher than the probability of dragging gesture, then judge that the current gesture is scrolling gesture.

10. The apparatus according to claim 9, wherein the calculating module comprises:

a time calculating unit, configured to calculate a difference between the time when the pointer equipment moves to the current position and the press-down time, to obtain a residence time of the pointer equipment;

a speed calculating unit, configured to calculate to obtain movement speed of the pointer equipment according to a difference between the current position where the pointer equipment moves and the press-down position.

11. The apparatus according to claim 9, wherein the calculating module comprises:

a direction calculating unit, configured to calculate to obtain movement direction of the pointer equipment according to following formulas:

$$A = \begin{cases} \arctan[(Y2-Y1)/(X2-X1)], & X1 \neq X2 \\ 90°, & Y2 > Y1, X1 = X2 \\ -90°, & Y2 < Y1, X1 = X2; \end{cases}$$

where $X1$ and $Y1$ are a horizontal ordinate and a vertical ordinate of the press-down position, respectively, $X2$ and $Y2$ are a horizontal ordinate and a vertical ordinate of the current position where the pointer equipment moves, respectively, and A is the movement direction of the pointer equipment which is represented with an angle.

12. The apparatus according to claim 9, wherein the probability calculating unit comprises:

a first calculating subunit, configured to compare the residence time with a preset time threshold value, to obtain a time probability of dragging gesture and a time probability of scrolling gesture; compare the movement speed with a preset speed threshold value, to obtain a speed probability of dragging gesture and a speed probability of scrolling gesture; compare the movement direction with a preset angle threshold value, to obtain a direction probability of dragging gesture and a direction probability of scrolling gesture;

a second calculating subunit, configured to calculate a weighted average of the time probability, speed probability and direction probability of dragging gesture according to preset time weight, speed weight and direction weight, to obtain the probability of dragging gesture; calculate a weighted average of the time probability, speed probability and direction probability of scrolling gesture according to the time weight, speed weight and direction weight, to obtain probability of scrolling gesture.

13. The apparatus according to claim 10, wherein the pointer equipment is a mouse, finger or touch pen.

14. The apparatus according to claim 11, wherein the pointer equipment is a mouse, finger or touch pen.

15. The apparatus according to claim 9, wherein the pointer equipment is a mouse, finger or touch pen.

16. The apparatus according to claim 12, wherein the pointer equipment is a mouse, finger or touch pen.

* * * * *